UNITED STATES PATENT OFFICE.

E. N. HORSFORD, OF CAMBRIDGE, MASSACHUSETTS, ASSIGNOR TO JOHN H. CHEEVER, OF NEW YORK, N. Y.

IMPROVED DOUBLE PHOSPHATE OF LIME AND SODA FOR CULINARY AND OTHER PURPOSES.

Specification forming part of Letters Patent No. 42,140, dated March 29, 1864.

*To all whom it may concern:*

Be it known that I, EBEN NORTON HORSFORD, of Cambridge, in the county of Middlesex and State of Massachusetts, have invented a new and Improved Phosphate of Lime and Soda; and I do hereby declare that the following is a full and exact description thereof.

The object of my invention is to produce a non-hygroscopic pulverulent double phosphate of lime and soda for use in the culinary preparation of farinaceous food, and for other desired purposes in the arts.

In my Letters Patent of April 22, 1856, I described an invention of what I called "pulverulent phosphoric acid," which was substantially a monobasic phosphate of lime mixed with free phosphoric acid, consisting, as a whole, of about one atom of lime and two atoms of phosphoric acid, mixed with flour and starch to increase its extent of surface and retard its chemical action, and dried at an elevated temperature to render it brittle. In this preparation the free phosphoric acid—that is, the acid above the ratio of one atom of acid to one of base—exerted constant affinity for moisture and rendered the preparation unsuited to certain important offices in the arts.

I have recently perfected another invention of what I call a "double phosphate of lime and soda," in which the number of atoms of base is equal to or slightly in excess of the number of atoms of acid, which is of permanent chemical constitution. The "pulverulent phosphoric acid," so called, contains free and uncombined phosphoric acid. This double phosphate of lime and soda contains none. For certain purposes the phosphate of lime and soda has the advantage of prompt action, and is relatively cheap.

I prepare the double phosphate of lime and soda as follows: To five thousand pounds of water I add five hundred pounds of oil of vitriol. To this mixture I add, with constant stirring, seven hundred pounds of burned bones, and continue brisk agitation for from sixteen to eighteen hours, when the whole is drawn into a suitable leech and thoroughly lixiviated. The result is that I have produced by this process and these proportions a liquid acid phosphate of lime in which about two-ninths of the lime of the original phosphate of lime remain in combination with the phosphoric acid. This extract is concentrated in suitable vessels, and as the evaporation proceeds I add hydrate of soda in the proportion of 0.0144 of a pound of avoirdupois for each degree of Baumé of every wine-gallon of the extract, and carry on the concentration till the whole becomes a thick emulsion of crystals. In place of the hydrate of soda, an equivalent of carbonate of soda may be employed.

The essential body produced by this process is a white crystalline compound of lime, soda, and phosphoric acid, which, on cooling, solidifies. It is a new composition of matter, in which by the humid process I obtain a hydrated crystalline double phosphate of lime and soda in which the ingredients are present in the proportions very nearly expressed in the following formula, to wit: $4CaO, 3NaO, 6PO_5 + xHO$, being not far from the proportions constituting a double monobasic phosphate of lime and soda. This double phosphate, on the addition of water, is resolved into insoluble and soluble phosphates, the latter acting as an acid in the neutralization of alkalies. The proportions of the agents employed are subject to a slight variation; but as an ordinary rule of manufacture in a large way experiment has shown these proportions to give satisfactory results. I have replaced the soda severally with equivalents of potassa and magnesia and produced double phosphates possessing most properties in common with the double phosphate of lime and soda. For practical purposes the double phosphates may be regarded as identical, except that the double phosphate of lime and soda is cheapest. This crystalline double phosphate of lime and soda above described is too concentrated for convenient use in the arts. The crystals are aggregated into groups, and the mass is more or less tough, and in time imbibes moisture from the air. To give the desired increased extent of surface, render it non-hygroscopic, preserve its homogeneity, and facilitate its reduction to powder, I proceed as follows: Just before the liquid is resolved into an emulsion of crystals it is removed from the fire, slightly diluted with gelatinized water, (made such by the addition of about three per cent. of starch, which is first moistened with cold water, and then stirred into boiling water,) and occasionally agitated for several hours to secure slow crystallization, coat each crystal with gelatinized starch, and prevent aggregation. When the mass has become cool for each degree of Baumé of each gallon of the original liquid I take for the mass which has been treated with hydrate of soda 0.0956 of a pound of dry, thoroughly-washed potatoe-starch and intimately incorporate it, adding, if necessary, gelatinized water from time to time until no dry starch-grains are visible. The mass is then spread on a floor in parcels of about a quarter of a cubic foot bulk each, and allowed spontaneously to dry in a moderately-warm room for several days. When sufficiently dry to crumble readily it is granulated by passing through a sieve of quarter-inch meshes, and spread out in a current of heated air of a temperature graduated from 110° to 150° Fahrenheit. When thoroughly dried it is ground and bolted, and is ready for certain uses. This gives a diluted double phosphate of lime and magnesia, of which one hundred parts will neutralize twenty-one of hydrate of soda. If a weaker phosphate is required, more starch may be added; if a stronger, less starch will be required. Instead of starch, equivalent farinaceous or other diluents—such as wheaten flour, corn-starch, rice-flour, gypsum, &c.—may be employed for certain purposes.

Where it is desired to mix the double phosphates with sensitive chemical compounds liable to decomposition on the absorption of moisture—as with bicarbonate of soda, for example—I sometimes treat the double phosphate dried and ground, as above described, as follows: To more effectually remove the hygroscopic property due to the dry starch incorporated with the double phosphate, I thoroughly knead the dried and ground diluted double phosphate, prepared as above, with a weak preparation of boiled starch until every particle of the powder is coated with the gelatinized water, and again dry and grind it, by which process the hygroscopic quality is nearly or quite destroyed, the powder being coated throughout with a thin non-hygroscopic and almost insoluble varnish.

To render my invention available in the culinary preparation of farinaceous food, and at the same time restore to the flour of cereals the phosphate of lime that has been separated with the bran in the process of bolting, I proceed as follows: It is well known that the essential and most valuable principle of leaven or yeast is its provision of a source of carbonic acid throughout the mass of moistened flour. As the carbonic acid is evolved the paste is distended, and becomes elastic and porous dough. In ordinary leaven the source of carbonic acid is decaying gluten or albumen and decomposing sugar.

The carbonic acid may be evolved from a mixture of solid acid—as tartaric acid or cream of tartar, for example—in the form of powder and bicarbonate of soda distributed throughout the flour on the addition of water. I employ for this purpose, as the solid acid, my double phosphate of lime and soda.

In the preparation of self-raising flour I proceed as follows: I take two pounds of double phosphate, (of a strength that twenty parts will neutralize nine parts of bicarbonate of soda,) nine-tenths of a pound of bicarbonate of soda, and one hundred pounds of flour. These are mixed as follows: First, the double phosphate is mixed with the flour and bolted. then the soda is added, and the whole is mixed and bolted again. This mixture is self-raising flour, and requires only the addition of salt and water to be resolved into dough ready for baking.

I also employ the double phosphate of lime and soda as follows: I take the double phosphate and its equivalent bicarbonate of soda in twin parcels of equal volume, the double phosphate in one and the bicarbonate of soda with the requisite salt and the remainder of the volume of starch in the other. The cook then takes equal measures from each parcel, and a number of tea-spoonfuls, for example, proportioned to the quantity of flour to be used.

I also employ the double phosphate as follows: I take the double phosphate above mentioned and its equivalent bicarbonate of soda in separate parcels, but in one package, in quantity suited to given weights of flour, according to the proportions mentioned under the first method. The contents of the separate parcels may be mixed and sifted with the proportional quantity of flour whenever and wherever self-raising flour is required.

I also employ the double phosphate of lime and soda as follows, adapting it to general use for culinary purposes: I mix the double phosphate, rendered specially non-hygroscopic, as above described, if necessary, and its equivalent of bicarbonate of soda, both thorougly dry, in air-tight bottles or boxes. This mixture may be added to the flour and salt as a yeast or baking powder, and the whole sifted and mixed with water and baked. I also employ it generally in the arts for neutralizing alkalies wherever a pulverulent acid may be required.

The body prepared as above described I call "double phosphate of lime and soda;" and

What I claim, and desire to secure by Letters Patent of the United States, is—

This double phosphate of lime and soda, of the composition and preparation substantially as above described, for the uses above set forth.

E. N. HORSFORD.

Witnesses:
H. N. STIMPSON,
FRANCIS L. CHAPMAN.